Figure 7:
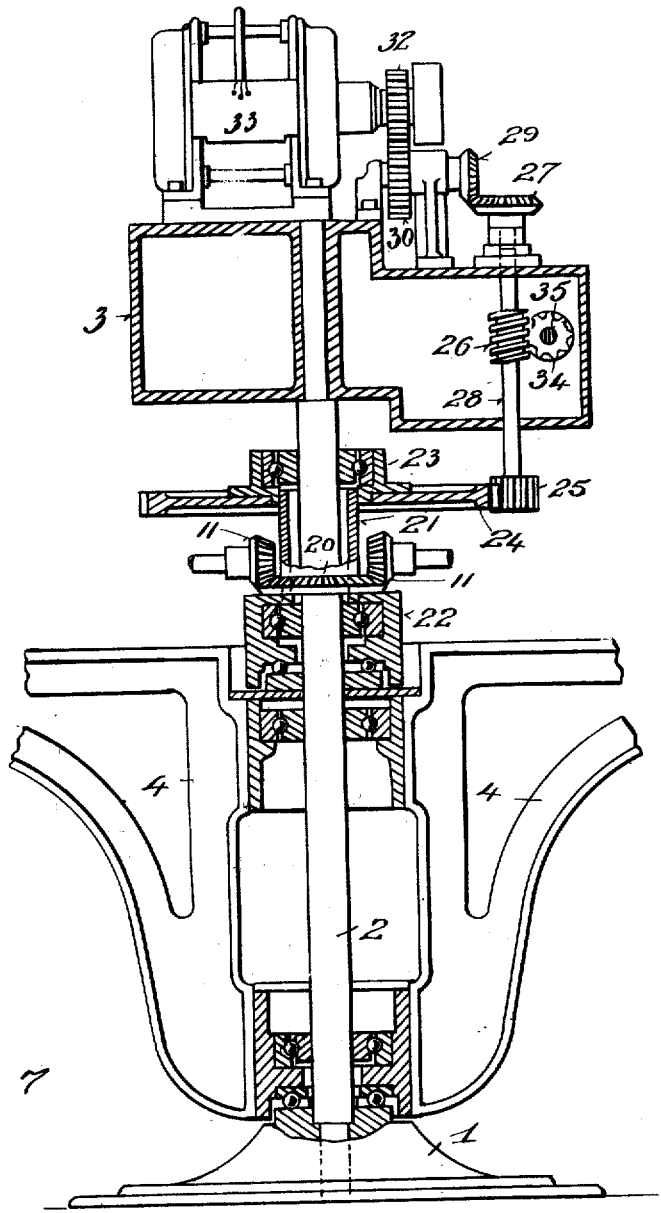

Apr. 17, 1923.  1,451,837
R. McCLENATHEN
BEAD MAKING MACHINE
Filed July 22, 1920  12 sheets-sheet 1
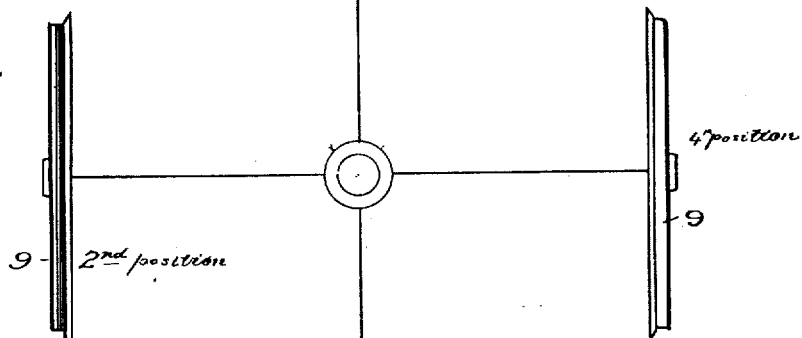
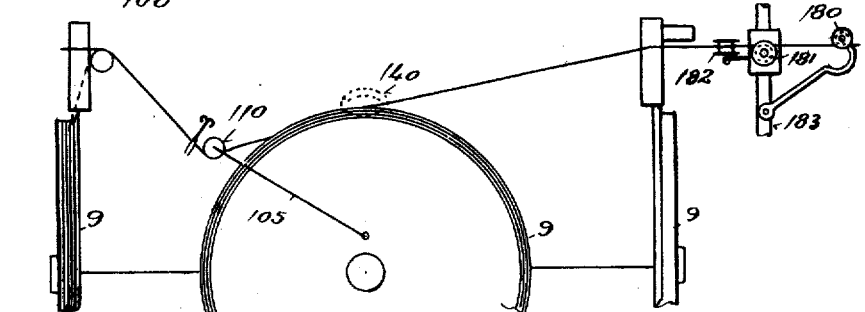
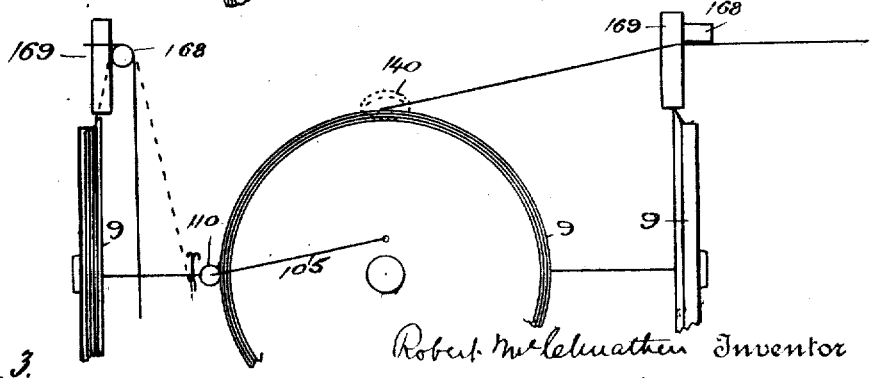
Robert McClenathen Inventor
By his Attorney Chas W Stapleton

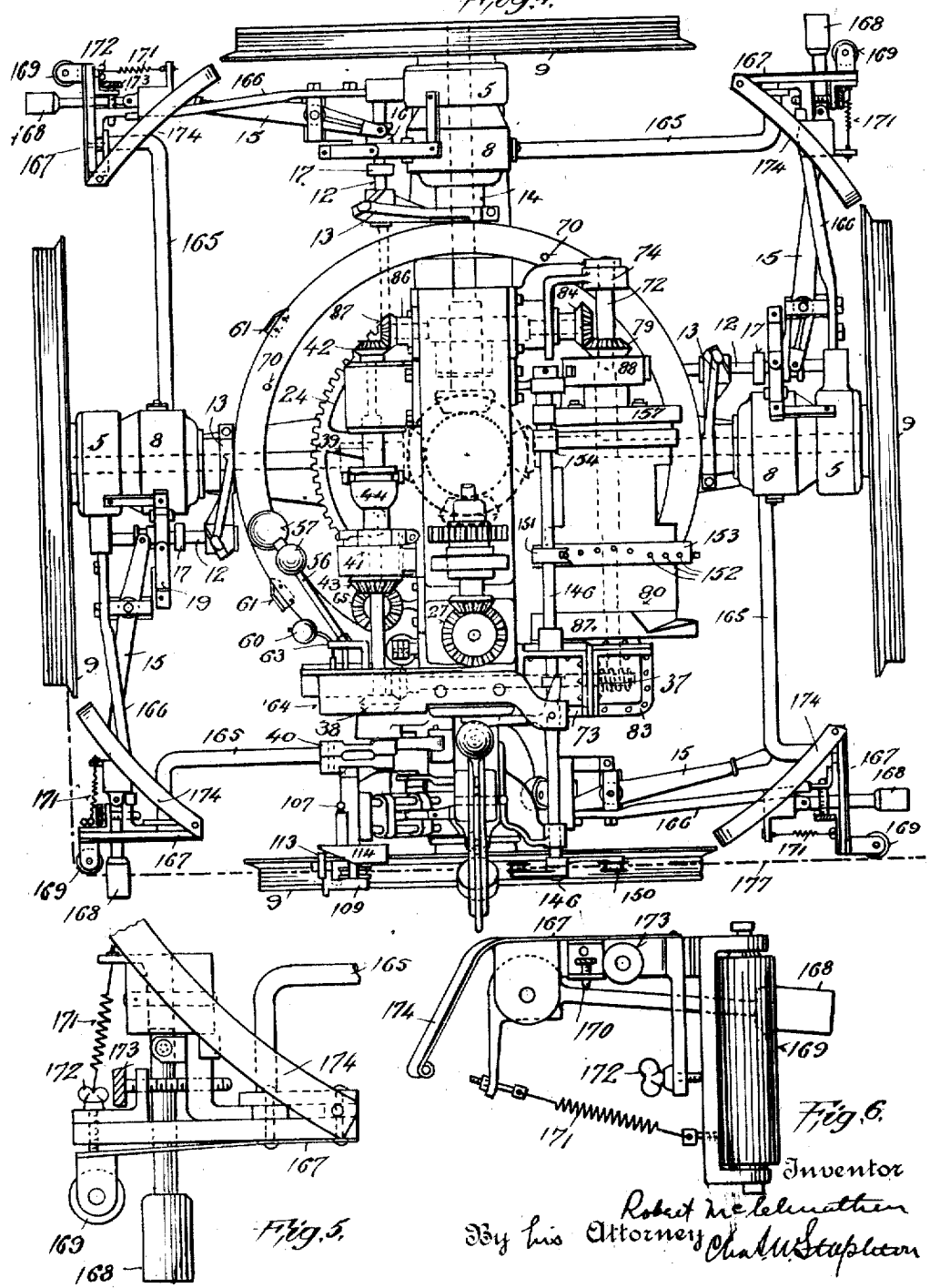

Apr. 17, 1923.

R. McCLENATHEN

BEAD MAKING MACHINE

Filed July 22, 1920

1,451,837

12 sheets-sheet 3

Robert McClenathen Inventor
By his Attorney Chas W Stapleton

Apr. 17, 1923.

R. McCLENATHEN 1,451,837

BEAD MAKING MACHINE

Filed July 22, 1920    12 sheets-sheet 7

Robert McClenathen Inventor
By his Attorney Chas. A. Stapleton

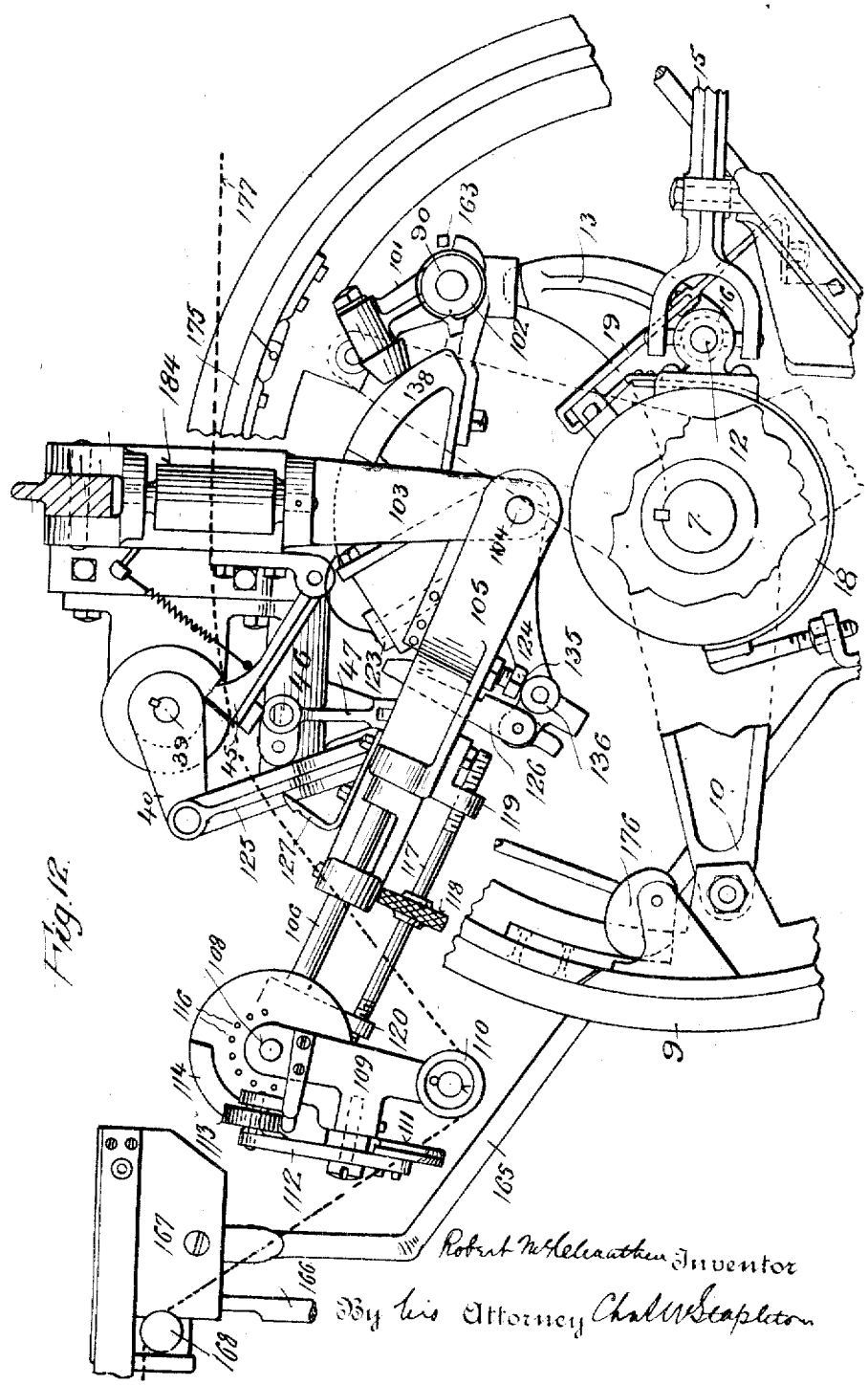

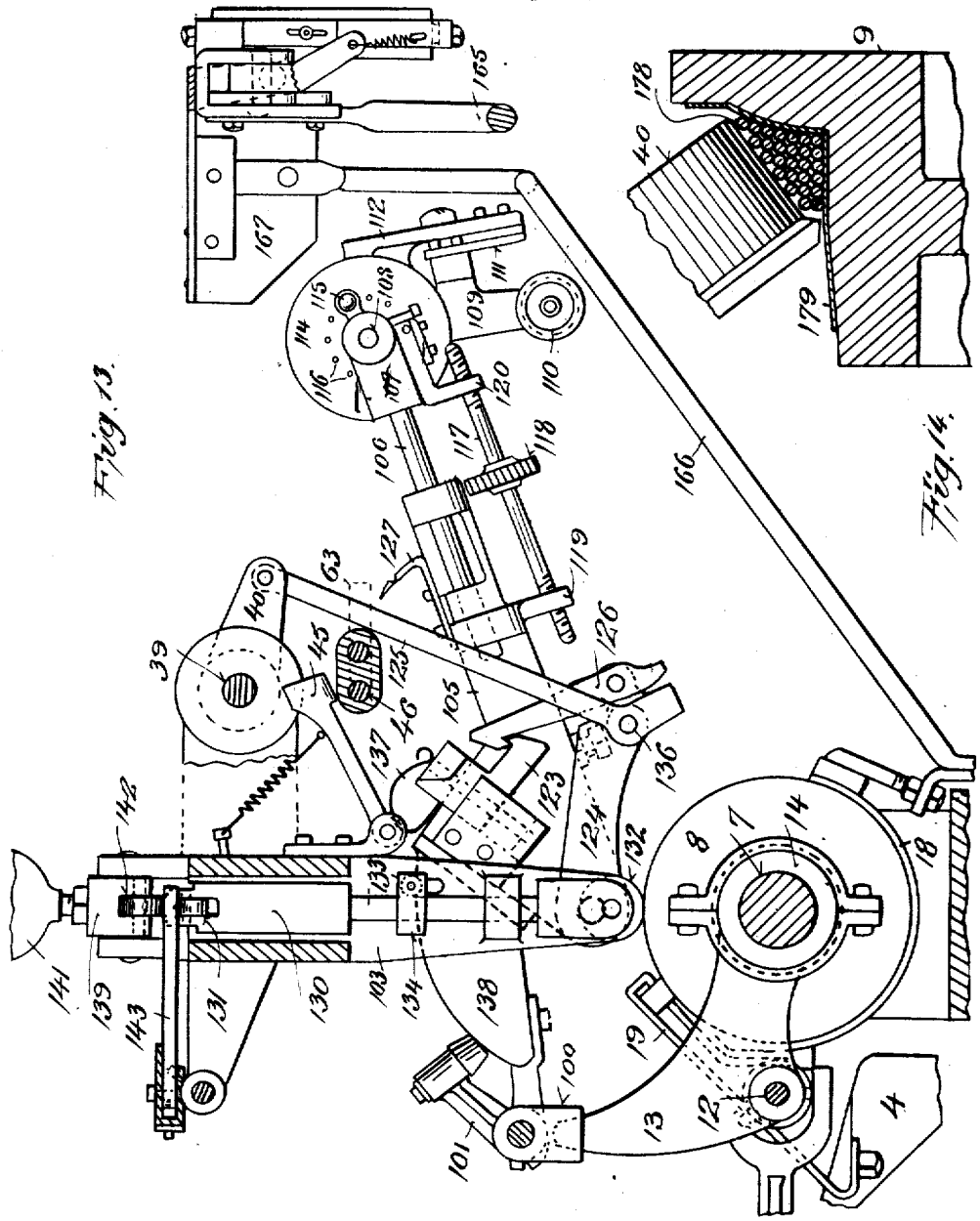

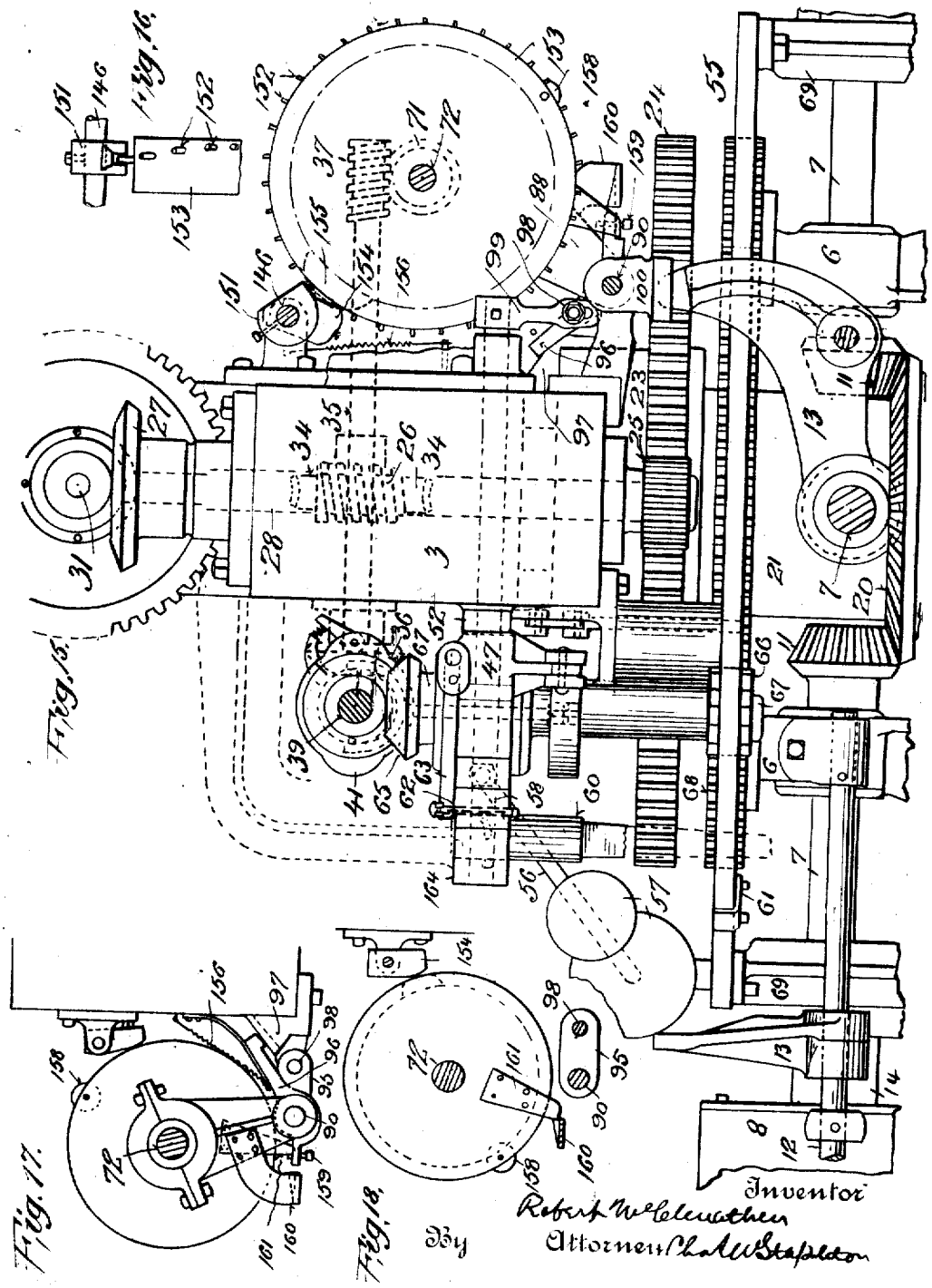

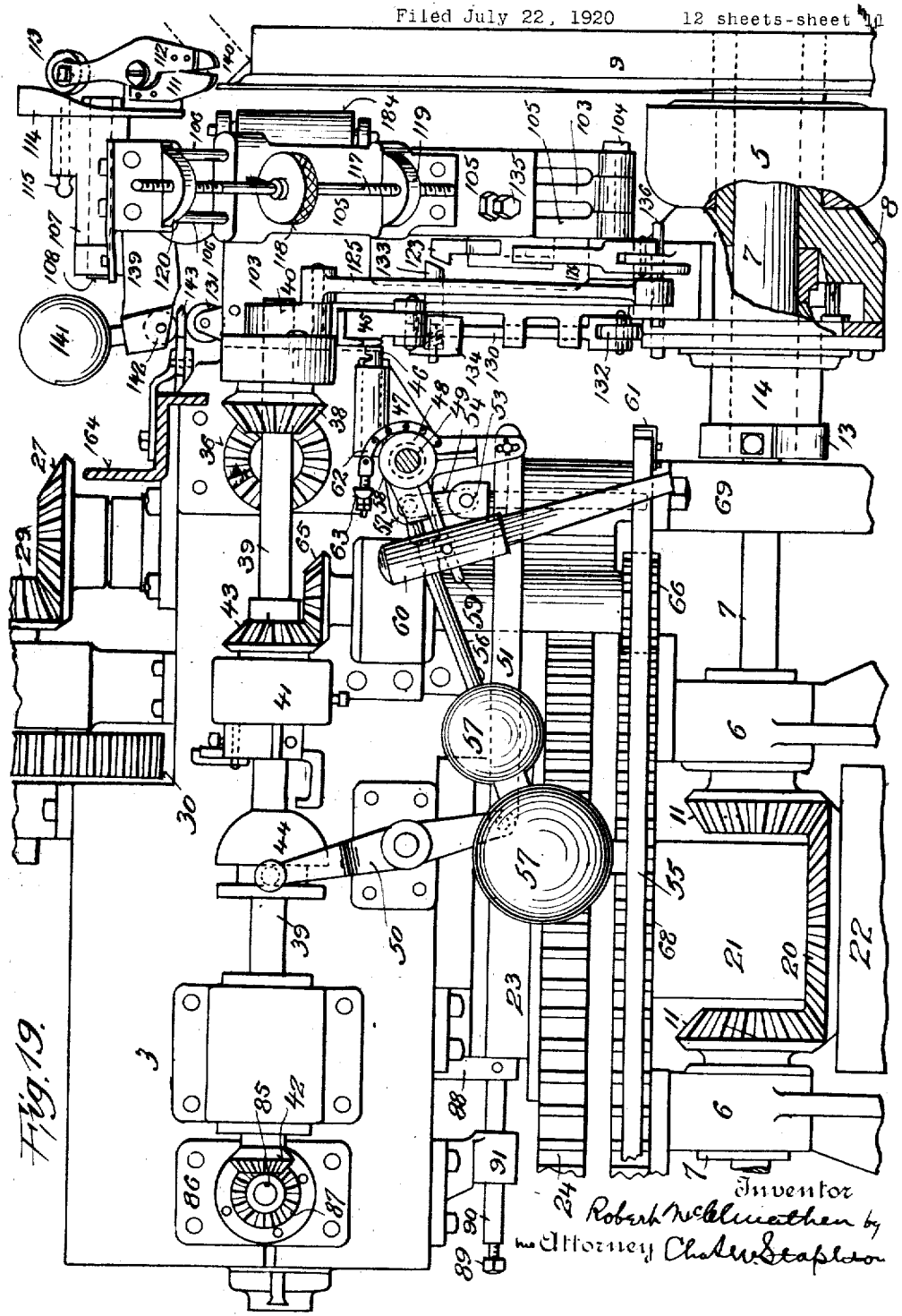

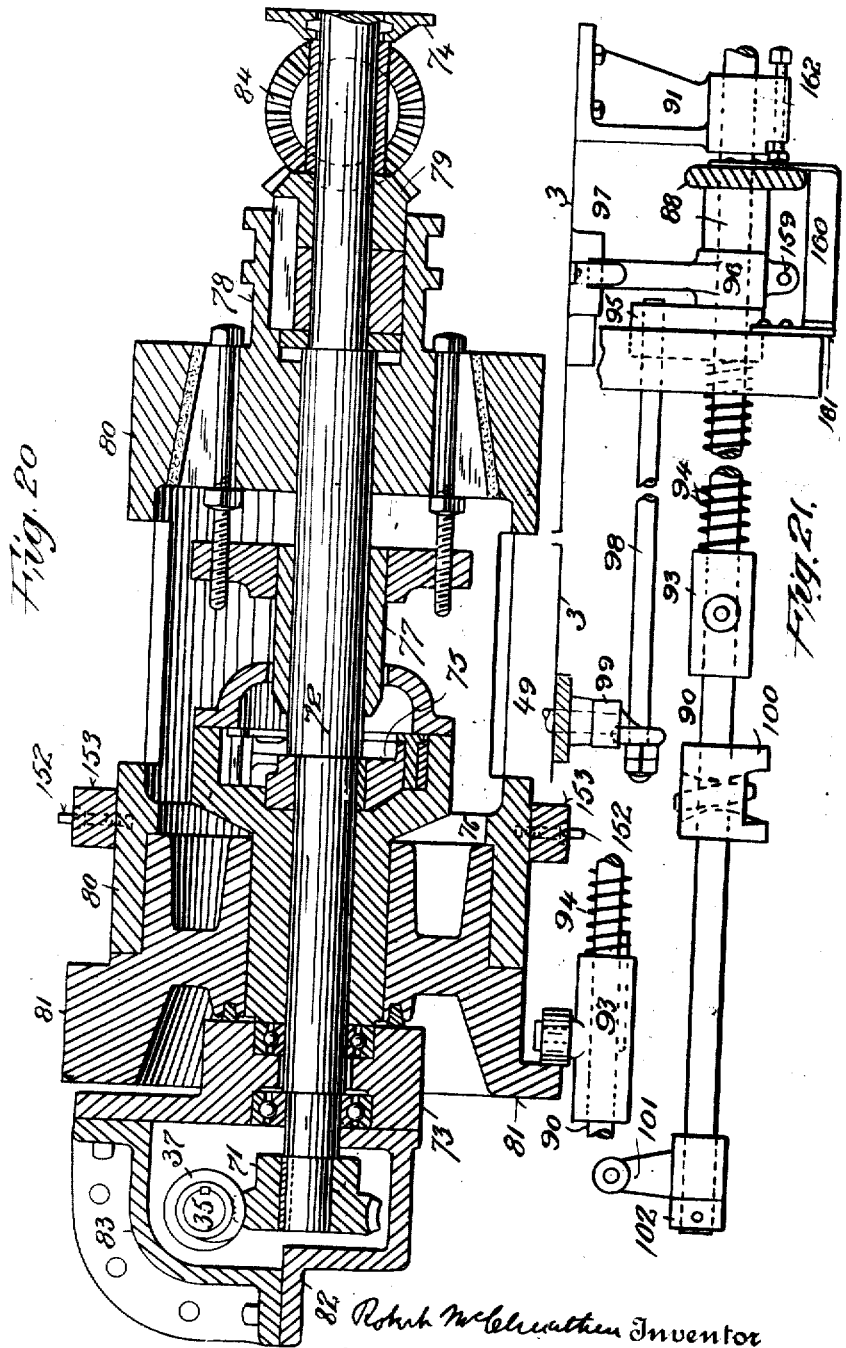

Patented Apr. 17, 1923.

1,451,837

UNITED STATES PATENT OFFICE.

ROBERT McCLENATHEN, OF CUYAHOGA FALLS, OHIO, ASSIGNOR TO KELLY SPRING-FIELD TIRE CO.

BEAD-MAKING MACHINE.

Application filed July 22, 1920. Serial No. 398,214.

*To all whom it may concern:*

Be it known that I, ROBERT McCLENA-THEN, a citizen of the United States, residing at Cuyahoga Falls, Summit County, and State of Ohio, have invented a new and useful Bead-Making Machine, of which the following is a specification.

An important part of a pneumatic tire casing is what is known in the trade as the beads which consist either of masses of small wires or strong fabric impregnated with some hard substance roughly of triangular shape in cross section and which are built into the interior extremities of the casing and entirely encircle the casing in the interior portions, and the function of which is to hold the softer part of the casing upon the tire rim and prevent its coming off in use. These beads are extensively made of a continuous strand of small wire which is wound upon a drum until the desired size and shape has been obtained, and in the better class of beads this strand of wire is coated with unvulcanized rubber so that each layer of wire is entirely insulated, and when vulcanized comprises substantially a solid mass of insulated wires, two of which beads are incorporated in each casing as it is constructed.

Heretofore these beads have usually been built by hand with alternate layers of wire and gummed fabric upon a forming drum which takes much time and labor and does not always result in an even disposition of the wires upon each other, whereas it is desirable to have each wire occupy its own separate position throughout the entire circle and in uniformed relation to the other wires in the bead.

In this hand process a strip of fabric coated with rubber of sufficient width to cover the completed bead is first laid down on the rim of the drum, over this is usually placed a layer of what is commonly called gum, that is to say, a compound of rubber only as distinguished from rubber coated fabric; the drum is then revolved by hand and the wire fed thereto with the other hand of the operator, until the bottom layer, (consisting of from 5 to 9 or more wires), has been deposited, when the wire is severed and another layer of gum is placed on the assembled wires and over this another layer of wires succeeded by another strip of gum and so on until the bead is built up of alternate layers of gum and wires to the desired height, after which the bottom layer of fabric, which is much wider than the widest layer of wires, is folded over so as to envelope the assembled wires and strips of gum, after which the bead is placed in a mold, vulcanized and is then ready for use in constructing the pneumatic tire.

There are several objectionable features to the hand process. 1st,—the wires cannot be laid down with sufficient tension. 2nd,— it is impracticable to use wires which are coated with unvulcanized rubber gum. 3rd,—wires so deposited are likely to get out of place so that they do not rest conformably upon each other. 4th,—much time is lost in laying down the intervening strips of gum and in securing the severed ends of the wires, and 5th,—the wire being severed at numerous points the bead is weaker than when made of a continuous strand.

The joint application of myself and Glen B. Heffelfinger, filed June 29, 1920, Serial No. 392,766 covers a machine for making beads of the character above described, but with that machine considerable hand work is necessary in placing and removing the drums and in starting, severing and fixing the ends of the wire.

The machine covered by the present application is designed for a continuous operation on three beads at the same time so that the bead is completely finished, ready for vulcanizing when it is taken from the drum and the hand work is reduced to a minimum.

As in the joint invention above referred to this machine is designed to take the coated wire directly from the coating machine and place it on the forming drum in successive layers of constantly diminishing widths until the bead is completed and practically simultaneously as the wire is coated with the unvulcanized rubber.

The general features of the machine consist of an upright column supporting four rotatable supporting brackets on which are mounted four horizontal shafts carrying four revolving bead forming drums, and said brackets, shafts and drums all swing turret like in the same plane around said column. Each drum in turn occupying four different positions and each drum in turn being filled with the wire as the turning of the machine swings the respective drums into position.

For convenience I will refer to that part of the machine shown in Figs. 1 and 4 where the wire is being fed to one of the forming drums as the front of the machine, and to the position of the drums at that point as first position, second, third and fourth positions follow in clockwise order.

A forming roller suspended at an angle to the face of the drums automatically operates in connection with the face of each drum and its flange to give the desired triangular shape to the bead. The wires having been laid down on the drum in its first position, this drum carrying the bead is automatically turned clockwise through 90 degrees of a circle and stops in the second position where the gummed fabric with which the drum has been previously supplied is folded over the wires and the bead completed and removed. The empty drum is automatically moved through 90 degrees of a circle to the third position where the workman supplies the necessary gummed fabric to the angle formed by the face of the drum and its flange and which constitutes the envelope finally surrounding the wires of the bead. The drum is then automatically moved through 90 degrees of a circle to the fourth position and subsequently a further 90 degrees to its original position ready to receive a second load of wires. Each drum in turn coming through the same continuous operation.

The desired and predetermined quantity of wire having been placed on the drum in first position the machine turns automatically 90 degrees carrying the unsevered strand of wire around a corner guide roller making a right angle in the wire at which time an arm equipped with a sheave roller and a pair of shears descends and presses the wire down and over the face of the empty drum, (which is now in first position) for about one-third of its surface and to which the wire readily adheres by reason of the gummed fabric with which the drum has been previously supplied, and while in this depressed condition the shears automatically sever the wire and the loose ends take their proper places on the respective drums, thus while the wire is being wound upon one drum the bead is being completed and removed from the preceding drum while the third drum is being equipped with the necessary gummed fabric. The fourth position is one for emergency only, no work being done there and so that if there is any delay in removing the completed bead or in applying the necessary gummed fabric, the operation can be completed while the drum is in this position without interfering with the regular movements of the machine.

In the accompanying drawings,—

Fig. 1,—is a diagrammatic sketch showing a plan view of the position of the four drums, and of the wire during a stop period of the operation.

Fig. 2,—is a vertical diagrammatic sketch view of a part of the machine showing the wire being started on a drum which has just been swung from fourth to first position.

Fig. 3,—is also a vertical diagrammatic sketch view of a part of the machine showing the wire fully depressed and severed, and the severed end laid down on a drum, which has been swung from fourth to first position, the preceding drum with wound up wire has passed to second position.

Fig. 4,—is a plan view of the principal parts of the interior of the machine, the driving motor omitted.

Fig. 5,—is an enlarged plan detail of the guide rollers and attachments shown on the corners of Fig. 4.

Fig. 6,—is an enlarged vertical detail of the guide rollers and attachments shown on the corners of Fig. 4.

Fig. 7,—is a sectional view in part of a part of the principal driving mechanism.

Figure 8:
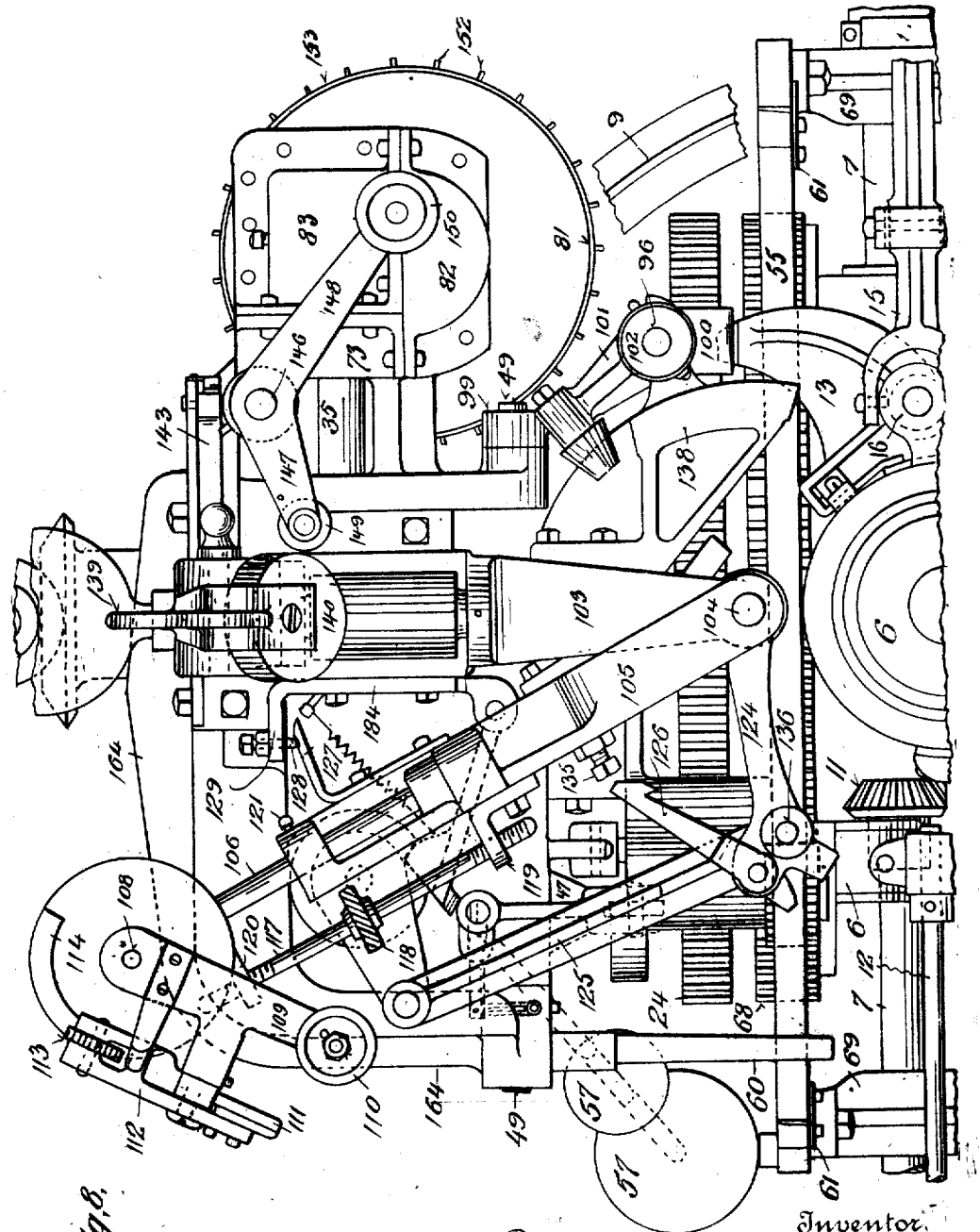

Fig. 8,—is a vertical front view of the upper parts of the machine with segment of a drum in first position.

Figure 9:
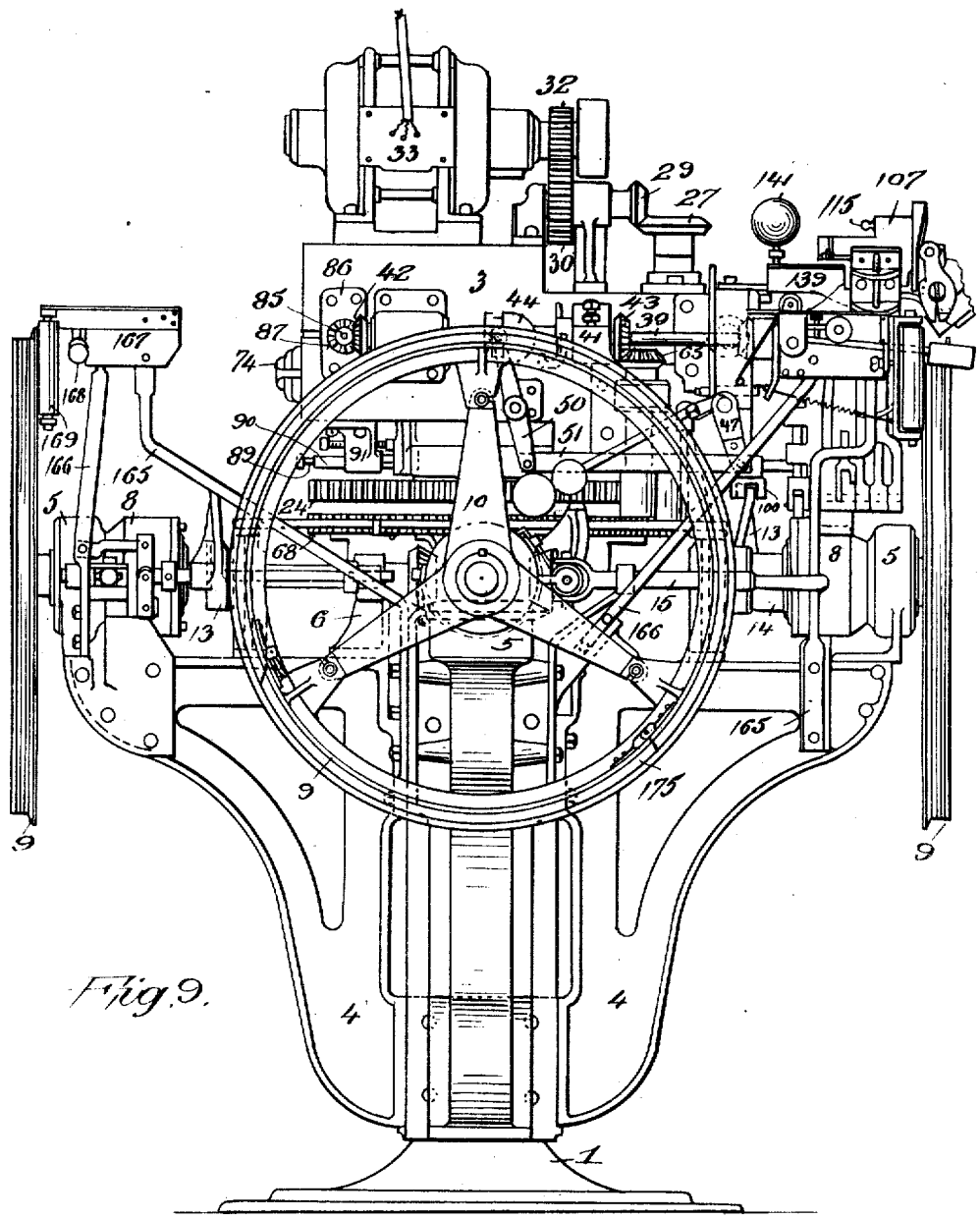

Fig. 9,—is a vertical view of the left hand side of the complete machine showing in the center a drum in second position.

Figure 10:
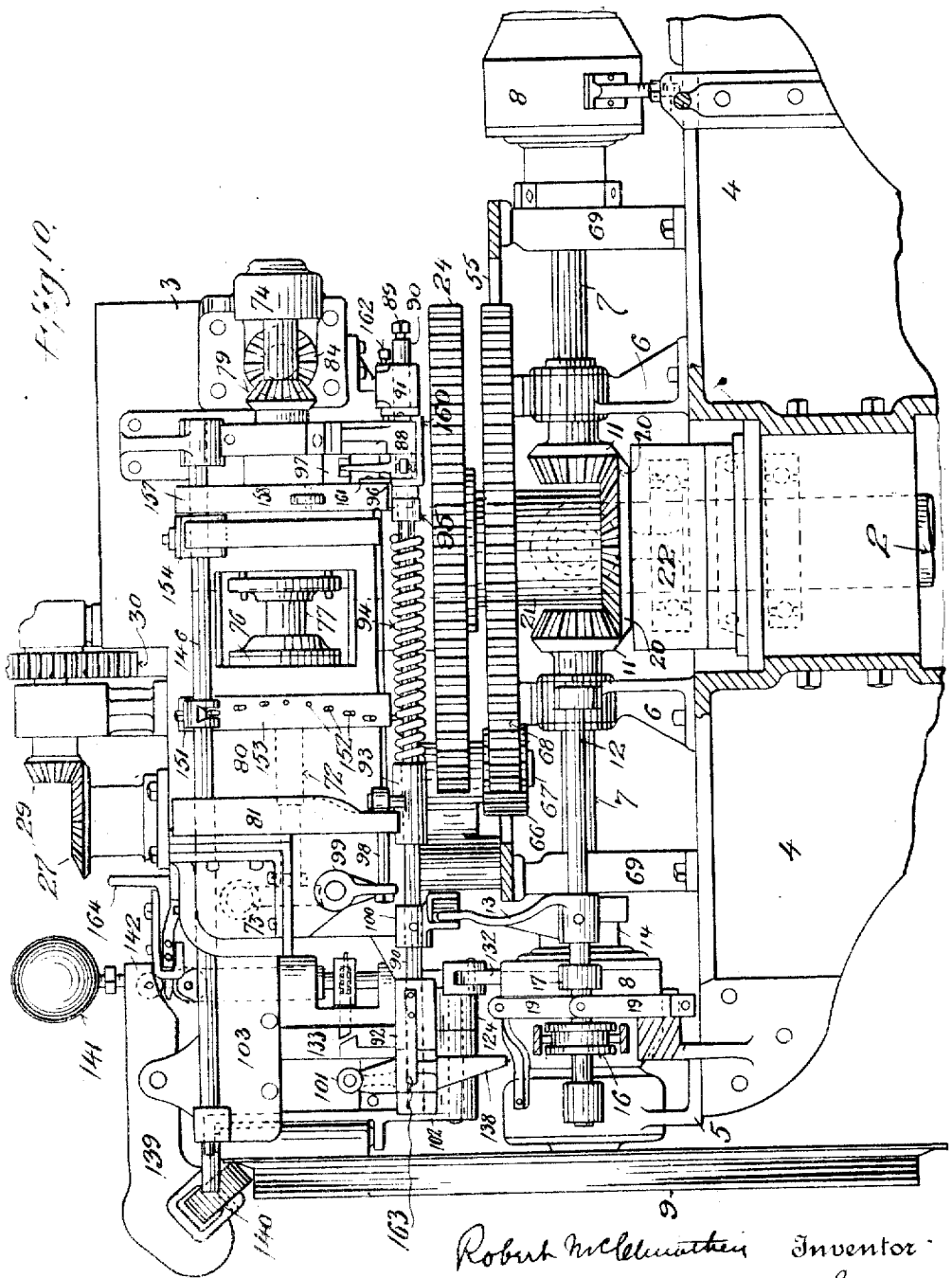

Fig. 10,—is a vertical view of the right hand side of the machine with a drum in first position at the left, drums in third and fourth positions being omitted.

Figure 11:
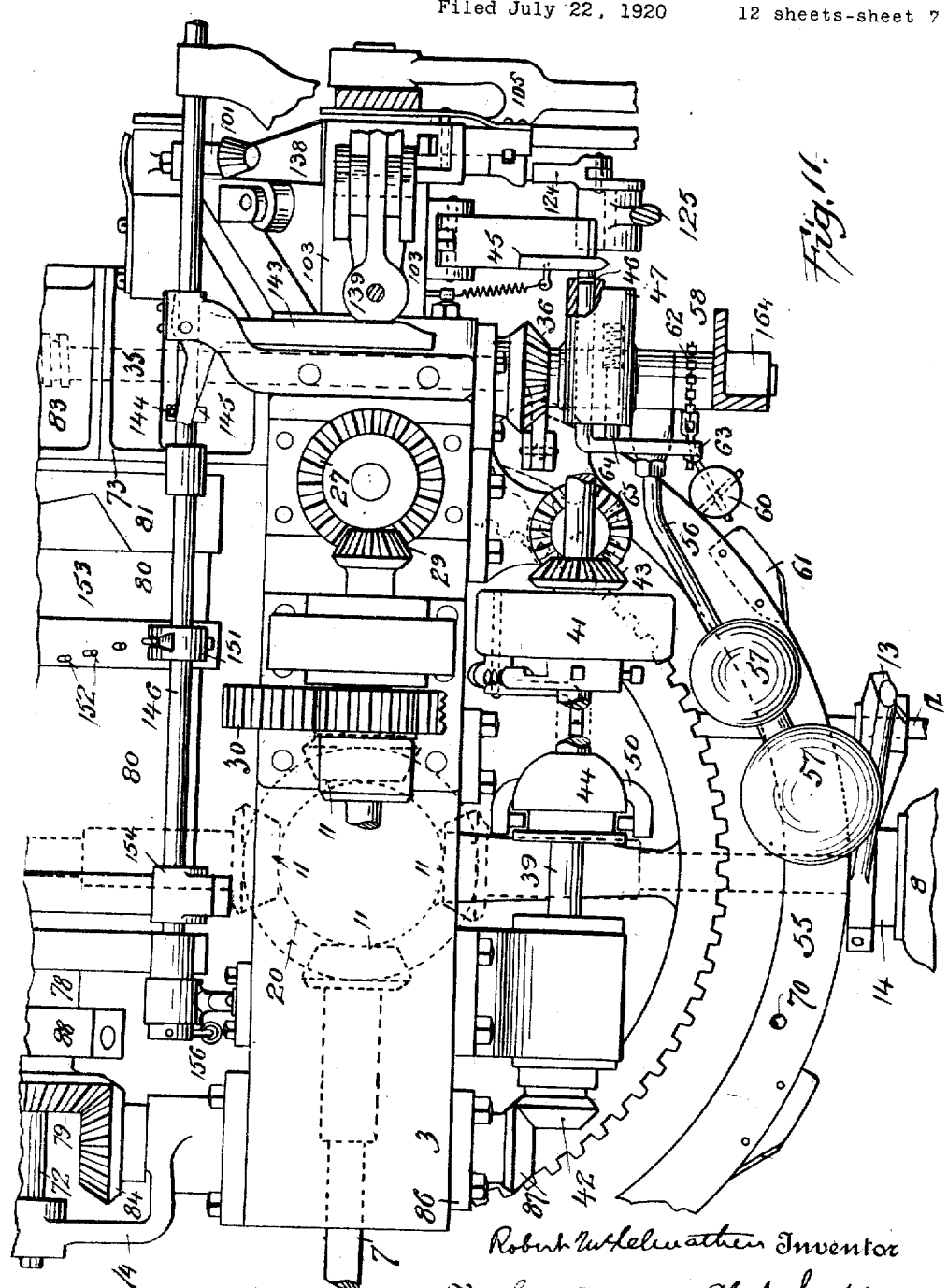

Fig. 11,—is a plan view of a part of the machine, the drums and motor being omitted.

Fig. 12,—is a vertical detail of a fragment of the machine looking from the front and showing fragment of a drum in first position and the wire leading to the preceding drum at the left, the preceding drum not shown in this figure.

Fig. 13,—is a view of the same parts of the machine as shown in Fig. 11, looking from the interior of the machine outward toward the front.

Fig. 14,—is a sectional view of a fragment of a drum with a fragment of the forming roller and section view of the gummed fabric and wire after the wire has been deposited on the drum.

Fig. 15,—is a vertical section of some of the interior parts of the machine looking from the front with the parts shown in Figs. 12 and 13 omitted.

Fig. 16,—is a fragmentary detail of the mechanism which actuates the wire guiding arms.

Fig. 17.—is a detail of the mechanism controlling and locking the clutches.

Fig. 18,—is also a detail of some of the controlling and locking mechanism.

Fig. 19,—is a vertical view of the left hand side of a part of the machine, drums in second and third positions omitted.

Fig. 20,—is a section of the clutch controlling and wire guiding mechanism.

Fig. 21,—is a plan view of the intermediate clutch controlling shaft and its attachments.

Like numerals refer to like parts in all figures. Referring to the drawings,—

Rigidly mounted in base piece 1 is supporting column 2, on which is rigidly mounted a rectangular housing 3; pivotally mounted on column 2 are four supporting brackets 4, on each one of said brackets is mounted the counterpart mechanism.

On brackets 4 are rigidly mounted bearings 5 and 6 in which bearings is revolvably mounted bead drum shafts 7 and friction clutches 8 which friction clutches extend through bearings 5 and on which friction clutch sleeves are rigidly mounted bead forming drums 9 by means of center spiders 10. Rigidly mounted on shafts 7 are beveled pinions 11. Also slidably mounted on bearings 5 and 6 are clutch shifting shafts 12 on which are rigidly mounted shifter yokes 13 which engage with cones 14 operating clutches 8. Clutch shifting shafts 12 are operated by means of hand levers 15 and grooved collars 16. Grooved collars 16 and plain collars 17 which are rigidly mounted on clutch shifting shafts 12 operate adjustable brake bands 18, (best shown in Fig. 12) by means of toggle links 19.

Beveled pinions 11 are driven by beveled gear 20 which is rigidly mounted on large sleeve 21, (best shown in Fig. 7,) which sleeve is rotatably mounted on supporting column 2 by means of end bearings 22 and 23, which end bearings are rigidly attached to said large sleeve 21. Rigidly attached to end bearing 23 is large spur gear 24 which is driven by spur pinion 25, (best shown in Fig. 7) which together with worm 26 and beveled gear 27 are rigidly mounted on vertical shaft 28. Beveled gear 27 is driven by beveled pinion 29 which together with spur gear 30 are rigidly mounted on shaft 31. Spur gear 30 is driven by spur gear 32 on motor 33. Motor 33 is mounted on rectangular housing 3. Worm 26 drives worm gear 34 which worm gear is rigidly mounted on horizontal shaft 35, (best shown in Fig. 15). On horizontal shaft 35 is rigidly mounted bevel gear 36 and worm 37, (best shown in Fig. 15). Beveled gear 36 drives beveled gear 38 which is rigidly mounted on horizontal crank shaft 39. Also rigidly mounted on horizontal crank shaft 39 is crank 40, friction clutch 41 and beveled gear 42. Friction clutch 41 engages frictionally with the hub of beveled gear 43 which is rotatably mounted on horizontal crank shaft 39. Friction clutch 41 is controlled by clutch cone 44 which is mounted on horizontal crank shaft 39. Clutch cone 44 is operated by means of crank 40 which depresses hinged arm 45 which in turn engages with a notch in plunger 46 in the arm of bell crank 47, which bell crank is rigidly mounted on sleeve 48 and which sleeve is rotatably mounted on shaft 49, (sleeve shown only by dotted circle in Fig. 19,) and thereby shifts clutch cone 44 by means of shifting lever 50 and connecting link 51. Also rigidly mounted on sleeve 48 is arm 52 which raises lock pin 53 by means of short connecting link 54, thereby releasing turret lock ring 55. Bell crank 47 has rigidly attached thereto counterweight arm 56 and spherical counterweights 57. Rigidly attached to shaft 49 is collar 58 which carries arm 59 on which is adjustably fastened dog 60 which dog when raised is supported by lugs 61 which are rigidly fastened to turret lock ring 55. Chain 62 is rigidly attached at one end to collar 58, the other end of said chain is adjustably fastened to a right angled extension 63 of plunger bar 46. Said right angled extension 63 being compressively connected with plunger bar 46 by means of a spring (not shown) in the arm of bell crank 47. The right angled extension 63 is supported and guided by arm 64 which also has a bearing in arm of bell crank 47.

Beveled gear 43 on horizontal crank shaft 39 drives beveled gear 65 which together with spur pinion 66 are rigidly mounted on turret drive shaft 67, (best shown in Fig. 15). Spur pinion 66 drives spur gear 68 which is rigidly attached to supporting brackets 4 by means of bearings 6.

Turret lock ring 55 is also rigidly attached to supporting brackets 4 by means of standards 69. Lock pin 53 engages with the stop holes 70 in turret lock ring 55. Worm 37 on horizontal shaft 35 drives worm gear 71 which is rigidly attached to cam drum shaft 72 which cam drum shaft is supported by bearings 73 and 74 which are rigidly attached to rectangular housing 3. Surrounding cam drum shaft 72 is a clutch consisting of several parts among which are driving collar 75 keyed to shaft 72 and clutch sleeve 76 which is driven by frictional contact when clutch cone 77 is inserted in said clutch. Clutch cone 77 is adjustably attached to friction clutch cone 78 which is rotatably mounted on cam drum shaft 72 and slidably mounted on hub of beveled gear 79, (best shown in Fig. 20), which clutch cone 78 drives cylinder 80, the opposite end of which cylinder is mounted on cam shaft cylinder head 81 which cylinder head in turn is rigidly mounted on loose clutch sleeve 76 which revolves on cam drum shaft 72. Worm gear 71 and worm 37 are covered by caps 82 and 83 on bearing 73. Beveled gear 79 is driven by beveled gear 84 rigidly attached to cam drum return shaft 85 (only the end of which is shown in Figs. 9 and 18) which shaft revolves in bearings 74 and 86 which bearings are rigidly attached to rectangular housing 3.

Beveled gear 87 is rigidly attached to the opposite end of shaft 85 which is driven by beveled gear 42. Friction clutch cone 78 and clutch cone 77 are simultaneously operated by means of shifter yoke 88 which is adjustably mounted, by means of adjusting screw 89, on clutch controlling shaft 90 which controlling shaft is slidably but not rotatably mounted in bearings 91 and 92 both of which bearings are rigidly attached to rectangular housing 3. Cam follower 93 is feather keyed to clutch controlling shaft 90 and is used to compress helical spring 94 surrounding clutch controlling shaft 90. Cam follower 93 is operated by cam shaped cylinder head 81. The opposite end of helical spring 94 presses against arm 95 which is also feather keyed on clutch controlling shaft 90 and which arm 95 in turn presses against lock dog 96 which is rotatably and slidably mounted on clutch controlling shaft 90, and which lock dog 96 engages with stop block 97 which is rigidly attached to rectangular housing 3. (best shown in Fig. 21). Arm 95 is pivotally attached to rod 98 which actuates lever arm 99 which is keyed to shaft 49 thereby causing shaft 49, collar 58, chain 62 and right angled extension 63 to move plunger 46 into engagement with hinged arm 45. On clutch controlling shaft 90 is also rigidly mounted a tangentially slotted collar 100 which engages with shifter yokes 13 when said yokes are in first position only thereby operating clutch 8 when in that position only. Also rotatably mounted on clutch controlling shaft 90 is cam follower 101 which cam follower is held on said clutch controlling shaft by collar 102 which is rigidly attached to said clutch controlling shaft.

Attached to the front end of rectangular housing 3 is supporting bracket 103 which carries hinged pin 104 on which is pivotally mounted extensible wire starting arm 105 which carries extension rods 106, to the outer ends of which rods is attached bearing 107 for shaft 108. Rotatably mounted on shaft 108 is swinging arm 109, on the lower end of which swinging arm is small sheave roller 110 which contacts with the bead building wire. Swinging arm 109 carries rigidly mounted thereon shear blade 111 and pivotally mounted thereon shear blade 112, the upper end of which shear blade 112 forms a bearing for cam roller 113, which cam roller and shear blade is operated by circular cam 114 which circular cam is adjustably mounted on bearing 107, and is held in position by spring pin 115 which engages with holes 116 in circular cam 114. Bearing 107 and its attached parts are movable outwardly and inwardly by adjusting screw 117 and which adjusting screw when turned by hand wheel 118 operates in threaded bearings 119 and 120. Extension rods 106 are held in place by set screw 121 and 122, the last named not shown on drawings.

Slidably attached to wire starting arm 105 is cam dog 123 which slides vertically when the wire starting arm is raised to an elevated position by rocker arm 124 and connecting link 125 which are pivotally attached to crank 40. Said wire starting arm is lowered by means of hook arm 126 pivotally mounted on rocker arm 124 which hook arm engages with cam dog 123. Wire starting arm 105 is held in an elevated position by means of notched spring 127 which engages with lock bolt 128 in bracket arm 129 which is rigidly attached to supporting bracket 103. (best shown in Fig. 8). Supporting bracket 103 carries plunger 130 on the upper end of which is roller 131, and on the lower end of which is roller 132 which contacts with, and is elevated by, the horizontal movement of friction clutch 8, and which roller 132 raises cam dog 123 by means of spring latch 133 which is attached to plunger 130 by means of bearing 134 which bearing is rigidly attached to said plunger. The maximum elevation of wire starting arm 105 is controlled by adjustable bolt 135 which contacts with shaft 136, and which shaft 136 connects rocker arm 124 and connecting link 125. After cam dog 123 is raised and engages with hook arm 126 it is subsequently released at the lower position of wire starting arm 105 by means of spring 137 which depresses cam dog 123. Mounted on the pivoted end of wire starting arm 105 is cam 138 which cam operates cam follower 101 thereby engaging friction clutch 8, clutch sleeve 76 and lock dog 96 with stop block 97. Pivotally mounted on the top of supporting bracket 103 is forming roller arm 139 carrying on its front end forming roller 140, and also on the rear end a spherical counterweight 141, and small roller 142 which is elevated by small roller 131 on the top of plunger 130, when that plunger is raised. Small roller 142 is further raised by the wedged shaped end of bell crank 143, which is inserted between small rollers 131 and 142 by means of pin 144 in collar 145 which is rigidly attached to wire guiding shaft 146. (best shown in Fig. 11). Wire guiding shaft 146 carries rigidly mounted thereon guide roller arms 147 and 148 on the ends of which are located sheave guide rollers 149 and 150 which rollers contact with the bead forming wire.

Wire guiding shaft 146 is actuated endwise by means of tangentially slotted collar 151 rigidly mounted thereon, which slot engages with pins 152 located in a zigzag line in the periphery of pin ring 153 which is rigidly mounted on cylinder 80.

Wire guiding shaft 146 is rotatably actuated by means of cam arm 154 which engages with cam 155 which is rigidly attached to cylinder 80, (best shown in Fig. 15). Wire guiding shaft 146 is held in normal operating position by means of spring 156 (best shown in Fig. 10).

Cylinder 80 has adjustably mounted thereon dog trip ring 157 which carries small roller 158 which roller engages with adjustable bolt 159 in lock dog 96 thereby releasing clutch controlling shaft 90, friction clutch 8 and clutch sleeve 76 which have been locked in engagement by lock dog 96 and stop block 97.

Rigidly attached to shifter yoke 88 is dog 160 which engages with lug 161 rigidly attached to the end of cylinder 80 thereby stopping the revolution of said cylinder at the same point in each revolution. Adjusting screw 162 is threaded into bearing 91 and is used to limit the horizontal motion of shifter yoke 88. On bearing arm 92 is stop arm 163 which limits the rotation of cam follower 101. Outboard bearing 164 is used to support the end of shaft 49 and is rigidly attached to the top of rectangular housing 3.

Supported by arms 165 and 166 which are rigidly attached to supporting bracket 4 are corner bearings 167 to which are pivotally attached horizontal wire guide rollers 168 and also to which are adjustably attached vertical wire guide rollers 169, said rollers being used to guide the bead forming wire in the starting and winding operation, horizontal guide rollers 168 are regulated as to height by adjusting screws 170 which are threaded in bearings 167, said horizontal guide rollers being held in contact with adjusting screws 170 by tension springs 171, vertical guide rollers 169 are adjusted horizontally by adjusting screws 172 and 173, guide track 174 on the top of corner bearings 167 is used to guide small sheave roller 110 to an elevated clearance position while said corner bearings 167 are passing underneath small sheave roller 110.

A part of each forming drum is a hinged section 175 held in place by cam 176.

The course of the wire is shown by dotted lines 177 in Figs. 5 and 12 and by full lines in Figs. 1, 2, and 3. The assembled wires 178 and gummed fabric 179 are shown in cross section, Fig. 14.

The operation of the machine is as follows:—

The necessary strips of gummed fabric 179 having first been supplied by hand to the drums, the workman leads a strand of wire under tension roller 180 and over guide rollers 181 and 182, (best shown on Figs. 1 and 2), and which last three mentioned rollers are supported independently of the machine on a vertical standard 183, the wire is then passed over sheave guide roller 150 and under guide roller 149 and on to the drum while in first position where the end readily adheres to the gummed fabric.

Hand lever 15 is then pushed back and locked in position by lock dog 96 engaging with stop block 97. This movement of the lever closes friction clutch 8 in first position and also closes clutch members 75 and 76 and at the same time disengages friction clutch cone 78 from cylinder 80 thus starting bead forming drum 9 to revolve in first position and in a counter clockwise direction, also revolving cylinder 80. As the wire starts winding on bead forming drum 9 in first position spring 156 turns wire guiding shaft 146 through 15 to 20 degrees of a circle and which turning is permitted by cam 155 turning away from cam arm 154. This turning causes pin 144 in collar 145 to push wedge shaped end of bell crank 143 between rollers 131 and 142 which elevates roller 142 which in turn elevates the rear end of forming roller arm 139 depressing forming roller 140 down to contact with the face of forming drum 9 and leaving a triangular space between the face of the forming roller, the face of the forming drum and its flange.

The turning of wire guiding shaft 146 simultaneously depresses sheave roller 149 and elevates sheave roller 150 so that both contact with the strand of wire and which sheave rollers are given a horizontal reciprocating movement by the pins 152 in pin ring 153 on cylinder 80, which pins operate the tangentially grooved collar 151 thus causing the strand of wire to move forward and back across the face of the forming drum, the desired and variable distances to put down the successive and constantly narrowing layers of wire on the forming drum as said drum revolves. The variable distances being regulated by the position of the pins 152 in pin ring 153 each pin controlling the location of each separate turn of wire on the forming drum.

The desired number of wires having been laid down upon the bead forming drum spring 94 which has been compressed by the revolution of cam shaft cylinder head 81 moving cam follower 93 is permited to move clutch controlling shaft backward by the action of small roller 158 disengaging lock dog 96 from stop block 97 thereby opening friction clutches 8 and 76 and closing clutch cone 78 with cylinder 80. The movement of clutch controlling shaft 90 tightens adjustable brake band 18 by means of toggle links 19 which at once stops the revolution of forming drum 9 when in first position.

Friction clutch cone 78 now operates to return cylinder 80 to its original starting position where it is stopped by lug 161 coming in contact with dog 160 which causes the clutch to slip temporarily. At this position of cylinder 80 cam 155 has lifted arm 154 to its original position thereby extending spring 156 and turning wire guiding shaft 146, sheave guide rollers 149 and 150 and bell crank 143 back to their original position releasing the wire for the turning operation.

A full complement of wire having been laid down on the forming drum while in first position the supporting brackets 4 with all the mechanism attached thereto including the four forming drums are swung to the left through 90 degrees of a circle and are there brought to rest and which is accomplished by the action of friction clutch 41 driving the beveled gears 43 and 65 and spur pinion 66 and spur gear 68 and which friction clutch 41 was closed by the downward motion of crank 40 which depresses hinged arm 45 to engage with the plunger 46 (and at this time only), thereby turning bell crank 47 which moves connecting link 51, shifting lever 50 and clutch cone 44. Hinged arm 45 was forced into engagement with the plunger 46 by the backward movement of clutch controlling shaft 90 which pushed plunger 46 into engagement with hinged arm 45 by means of the several connecting parts, viz,—right angled extension 63, chain 62, collar 58, shaft 49, lever arm 99, rod 98 and arm 95 on clutch controlling shaft 90. Simultaneously with the closing of friction clutch 41, the turning of bell crank 47 disengages lock pin 53 from turret lock ring 55 thereby permitting the lock ring to revolve through 90 degrees of a circle with the forming drums. The turning of bell crank 47 also raises counterweight arm 56 and spherical counterweights 57 which are held up while the turret lock ring turns through the said 90 degrees and are supported in an elevated position until lock pin 53 riding on the top of turret lock ring 55 fall into the next stop hole 70 in the turret lock ring, into which hole lock pin 53 drops permitting the spherical counterweights to turn bell crank 47 and disengage friction clutch 41, thus locking the forming drums in their new position, the drum containing the assembled wire, now being in its second position. Plunger 46 is held in position to engage with hinged arm 45 by means of dog 60 being raised by arm 59 and collar 58 on shaft 49, which dog 60 when raised rests on lug 61 mounted on turret locking ring 55, until lug 61 is actuated by the turning movement of turret lock ring 55. Bell crank 47 carrying plunger 46 and spherical counterweight 57 together with arm 52 which are rigidly mounted on sleeve 48 which is rotatably mounted on shaft 49 are turned only by the downward action of crank 40, which crank moves rocker arm 124 upward while friction clutch 8 moves around with the loaded forming drum from first to second position, thus preventing an interference of rocker arm 124 with friction clutch 8.

The swinging parts of the machine being now temporarily at rest with the loaded forming drum in second position, the wire strand extending from the loaded forming drum around guide rollers 168 and 169 at right angles and over the top of the succeeding empty forming drum which is now in first position and where the wire has been drawn by the swinging movement of the loaded drum. (See Fig. 1). At this stage small sheave roller 110 and shear blades 111 and 112 descend astride of and carry down the wire strand until they reach the position shown in Fig. 3 where the wire is severed by the shear blades which are closed by the operation of small sheave roller 110 traveling down on the face of the drum in first position thus actuating, swinging arm 109 which pushes cam roller 113 around on circular cam 114.

The depression of the strand of wire it will be seen brings a portion of the severed end down over the forming drum now in first position (and which as hereinbefore stated has been supplied with a strip of gummed fabric to which the wire being gummed readily adheres) ready for the continued winding operation.

Wire starting arm 105 is swung down by hook arm 126 which hook arm is attached to rocker arm 124 and which hook arm engages with cam dog 123 attached to wire starting arm 105. At the lower position of arm 105 cam dog 123 is pressed down by spring 137 and is disengaged from lock arm 126, thus it will be seen that while rocker arm 124 and hook arm 126 oscillate up and down continuously with every revolution of crank 40, hook arm 126 engages with cam dog 123 only when said cam dog is raised and held in its upper position.

The shears are carried down but once for each bend and this occurs at the proper time through the operation of plunger 130 and spring latch 133 both of which descend by gravity a distance sufficient to permit spring latch 133 to engage with cam dog 123 and which occurs when friction clutch 8 moves away from first position thereby permitting the plunger 130 to move downward, and which plunger is again raised by the succeeding friction clutch 8 moving into first position thereby raising cam dog 123. After severing the wire the shears and sheave roller 110 are raised by the upward movement of crank 40 which pulls connecting link 125 attached to shaft 136 which shaft extends under adjustable bolt 135 on the underside of wire starting arm 105 and which arm is held in a raised position by notched spring 127 engaging with lock bolt 128, and is again released when punger 130 functions causing the engagement of hook arm 126 and cam dog 123.

It will be noted that the lowering of plunger 130 permits the rear end of forming roller arm 139 to drop sufficiently so that forming roller 140 is raised clear of the forming drum and flange.

The machine now being in position for winding the wire on the second or succeeding drum, friction clutch 8 and clutch sleeve 76 are automatically and simultaneously thrown into engagement by the raising of wire starting arm 105 which causes cam 138 attached thereto to move cam follower 101 and clutch controlling shaft 90 forward, which automatically produces the same result as the original and first pushing back of hand lever 15 and from this point the machine automatically repeats all of the operations previously described, automatically, continuously and indefinitely.

Friction clutches 8 are not automatically operated in second, third and fourth positions of the forming drums but may be engaged or disengaged at the will of the operator working in any of said positions by means of hand lever 15. All other operations of the machine are automatic and repeat themselves in continuous succession.

It will thus be seen that but two operators are necessary, none being required at the first position after the wire has once started to wind. The operator at second position folds the gummed fabric over the wires as the drum revolves and removes the completed bead while at the same time the operator at third position supplies the gummed fabric to the empty drums as they reach him in successive order. As previously stated ordinarily no work is accomplished in fourth position but in case of the failure to clear the drum of the bead while it is at second position or to supply the gummed fabric while it is at third position, either of these operations may be completed at the next succeeding position.

The machine is operated by motor 33 through spur gears 30 and 32, beveled gear wheels 27 and 29, spur gears 24 and 25, beveled gear 20 and beveled pinions 11 which keep forming drum shafts 7 in continuous operation. Cam drum shaft 72 is continuously operated by worm gear 71, worm 37, worm gear 34, worm 26 and beveled gear 27. Crank shaft 39 is continuously operated by beveled gears 36 and 38 and worm gear 34. The supporting brackets 4 are intermittently revolved by spur gear 68, spur pinion 66, beveled gears 65, 43 and friction clutch 41. Cylinder 80 is operated intermittently at low speed by worm gear 71, worm 37, worm gear 34, friction clutch sleeve 76, and cylinder 80 is returned to the starting position at high speed by friction cone 78, beveled gears 79, 84, 87 and 42.

Bearing roller 184 facilitates the even and smooth running of bead forming drum 9.

The gummed wire is taken directly from the gumming machine (usually called tube machine) as it is gummed, so that as the wire comes through the die of the gumming machine encased with the gum it passes at once to the drum in first position, and after being started thereon the machine operates continuously without further attention.

As the engagement of each pin in pin ring 153 is only sufficient for the laying down of one wire, and as the number of wires in beads vary from fifteen to a hundred, the number of pins in the ring should be equal to the maximum number of wires that may be used, therefore, while working on beads having only a small number of wires there will usually be a number of pins unused when the bead is completed and as the movement of the pin ring during the winding operation is comparatively slow it will be a waste of time to wait while the pin ring operated through the unused pins at the slow speed, to overcome this, cylinder 80 is given two speeds, a slow speed while the wire is being laid down and a high speed when the winding of the wire is complete to turn the unused pins quickly through the tangentially slotted collar and the pin ring to its original position.

Forming roller 140 is made larger at the upper than at the lower end to obviate slipping as it will be seen that the upper end travels through a larger circumferential path than the lower end.

Having described my invention I claim,—

1. In a machine of the character described, a hinged wire starting arm, adapted to swing vertically and having attached to its free end a roller and wire cutting shears, said roller adapted to press a strand of wire down over a bead forming drum and said shears to automatically sever said wire when in a depressed position, means to hold said roller and shears in position.

2. In a machine of the character described, a hinged wire starting arm adapted to swing up and down and having attached to its free end a supplemental swinging arm, a roller and wire cutting shears attached to said supplemental swinging arm, said roller adapted to press a strand of wire down over a bead forming drum and to cause said cutting shears to automatically sever said wire when held down by said roller, means to automatically lower and raise said hinged arms and attachments and means to operate said shears.

3. In a machine of the character described, a wire guiding shaft, a tangentially slotted collar mounted thereon, a revolvable pin ring having on its periphery a plurality of projecting pins adapted to operate in said tangential slot, whereby said wire guiding shaft may be given a reciprocating movement and means to revolve said pin ring.

4. In a machine of the character described, the combination of a central driving portion, revolvable drum carrying arms connected therewith and radiating therefrom, bead forming drums mounted on the exterior ends of said arms and means to revolve said drums independently of each other, guide rollers supported between said drums and adapted to control the position and direction of a bead forming wire, said arms, drums and guide rollers constituting counterpart units, means to automatically and simultaneously revolve said units around said central portion in an intermittent movement with regular stops every ninety degrees of a circle, a bead forming roller having ends of unequal diameter and adapted to revolve at an angle to the face of said drums and in contact therewith, a slidably mounted wire guide shaft, and means to slide said shaft in a reciprocating movement across the face of said drums, a hinged wire starting arm carrying wire cutting shears means to automatically raise and lower the free end of said arm and to operate said shears.

5. In a machine of the character described, a combination of a central driving portion revolvable drum carrying arms connected therewith and radiating therefrom, bead forming drums mounted on the exterior ends of said arms and means to revolve said drums vertically and independently of each other, guide rollers supported by brackets radiating from said central portion, located midway between said drum carrying arms and adapted to control the position and direction of a bead forming wire, said arms, drums, brackets and guide rollers constituting counterpart units of said machine, means to automatically and simultaneously revolve said units around said central portion in an intermittent movement with regular stops at every ninety degrees of the circle, a bead forming roller having ends of unequal diameter and mounted so as to revolve at an angle to the face of said drums and in contact therewith, a slidably mounted wire guide shaft, and means to automatically move said shaft across the face of said drums in a reciprocating movement of gradually lessening extent, a hinged wire starting arm carrying wire cutting shears, means to automatically raise and lower the free end of said arm and to operate said shears when said arm is in a depressed position.

6. A machine of the character described, comprising: a multiple-spindle turret mounting having centrally disposed driving gear; horizontal drum spindles radiating from the mounting; stock-forming drums on the spindles; spindle driving means from a common source; means for simultaneously or selectively rotating the stock-forming drums; means for orbitally rotating the drum spindles and drums intermittently within predetermined radial limits; and means in synchronized relation with the orbital rotating means and the spindle rotating means whereby either may be in motion irrespective of the other, under automatic control.

7. A machine of the character described, comprising: a multiple-spindle turret mounting including a self-contained driving gear; horizontal drum spindles radiating from the mounting; stock-forming drums on the spindles; spindle driving means from a common source; means for simultaneously or selectively rotating the stock-forming drums irrespective of their orbital relation with the mounting; means for orbitally rotating the drum spindles and drums intermittently within predetermined radial limits; stock laying means adapted to automatically distribute the stock on a drum element in mechanically controlled relation; means for intermittently operating the stock laying means in synchronized relation with the spindle driving means; and automatic means for severing the stock when a predetermined amount has been accumulated on a drum.

8. A machine of the character described, comprising: a multiple-spindle turret mounting including a self-contained driving gear; horizontally disposed revoluble stock drums radially disposed on said mounting and gear-driven therefrom; automatically controlled means for intermittently swinging said stock drums orbitally within predetermined radial limit stations; means adjacent one radial limit station for automatically performing different successive operations on a stock member on one of said stock drums, said operations comprising, laying an end of the stock member on said drum, guiding the stock as it is drawn onto the drum to conform to a predetermined winding contour, pressure rolling said guided stock, and finally severing the stock after a predetermined amount has been accumulated on the drum.

9. A machine of the character described, comprising, in combination, a multiple-spindle turret mounting having revoluble stock-forming drums on the spindles, means for rotating the drums intermittently, means for intermittently orientating the drums horizontally within predetermined circular limits; and automatically applied tools operable upon the stock on one drum during an interval of rest between orientation periods, said tools being adapted to successively lay the stock, guide its disposition on the drum, pressure roll the guided-on stock, and finally sever the stock at a predetermined limit.

10. A machine of the character described, comprising, in combination, a multiple-spindle turret mounting having revoluble stock-forming drums on the spindles, means for rotating the drums intermittently, means for intermittently orientating the drums horizontally from one predetermined station to another with a period of rest between successive orientation, means for automatically winding a stock strand on the drum during a period of rest; and means for orientating the stock-wound drum to an advanced station upon the completion of the winding operation with the stock lead intact.

11. A machine of the character described, comprising, in combination, a multiple-spindle turret mounting having revoluble stock-forming drums on the spindles, means for rotating the drums intermittently, means for intermittently orientating the drums horizontally from one predetermined station to another with a period of rest between successive orientations, means in fixed relation with one of said stations of rest adapted to automatically control the operation of winding a stock strand on a drum, means for thereafter orientating the stock-wound drum to an advanced station upon the completion of the winding operation with the stock lead intact; and means for thereafter severing the stock lead from the wound drum and automatically pressing a severed end thereof into adhering contact with a second drum that has replaced the station vacated by the first drum.

12. A machine of the character described, comprising means for automatically and simultaneously winding, mechanically arranging, and pressure-rolling bead forming stock on one of a series of revoluble stock drums radially mounted for orientation from predetermined station to station; means for orientating the stock-wound drum to a new station upon the completion of the bead winding with the strand stock unsevered and positioning an empty stock drum in the vacated station; and means for automatically severing the stock lead from the orientated wound drum at a predetermined point and frictionally laying a severed end upon the periphery of the empty drum.

13. A machine of the character described, comprising; a plurality of revoluble stock-forming drums radially positioned on a common orbitally mounted frame; means for rotating the drums selectively or simultaneously; means for orbitally moving the drums intermittently between fixed stations; automatic means for rotating each drum successively at one of said stations within the operating zone of stock-forming tools; automatic stock-forming tool means for emplacing a bead, comprising a plurality of circumferentially applied adhesive stock strands, on a drum rotating at one fixed station; means for orbitally shifting the completely formed bead on its drum to an advanced station; and means for thereafter severing the intact stock strand from the finished work and applying one severed end to an empty drum substituted in the station vacated by the first drum.

ROBERT McCLENATHEN.